United States Patent [19]

Graham et al.

[11] 3,769,463

[45] Oct. 30, 1973

[54] ELECTRONIC LONG-DISTANCE TELEPHONE CALL COMPUTER AND RECORDER

[75] Inventors: Philip G. Graham, Hollywood; Lawrence Reich, West Hollywood, both of Fla.

[73] Assignee: Lorbon Manufacturing Co., Inc., West Hollywood, Fla.

[22] Filed: Feb. 28, 1972

[21] Appl. No.: 229,711

[52] U.S. Cl. .......... 179/7.1 TP

[51] Int. Cl. .......... H04m 15/18

[58] Field of Search .......... 179/7 R, 7.1 TP, 179/7.1 R

[56] References Cited

UNITED STATES PATENTS

| | | | |
|---|---|---|---|
| 3,075,698 | 1/1963 | Fletcher | 179/7.1 R |
| 3,673,793 | 7/1972 | Barnard | 179/7.1 R |
| 3,390,395 | 7/1972 | Gamburd | 179/7.1 R |

*Primary Examiner*—Kathleen H. Claffy
*Assistant Examiner*—Kenneth D. Baugh
*Attorney*—James B. Kinzer et al.

[57] ABSTRACT

Apparatus for automatically computing and recording the cost of a long-distance telephone call including a call cost register for cumulatively indicating on a digital display the cost of a call being made and responding to a computer having an input of the cost data for the call and an input of the time period of the call wherein the computer and recorder operate automatically in response to signal information taken directly from the telephone. Additionally, an elapsed time indicator digitally displays the time period of the call and a cumulative cost register records and digitally displays the cost of all calls made.

7 Claims, 6 Drawing Figures

ELECTRONIC LONG-DISTANCE TELEPHONE CALL COMPUTER AND RECORDER

This invention relates in general to a computing and recording apparatus for computing and recording the cost of long-distance telephone calls and more particularly to such a computing and recording apparatus that is solid state in construction and automatically responsive to signals generated directly from the telephone.

The indication and/or recording of long-distance telephone call costs is of especial importance to certain business offices for the purpose of facilitating expense allocating procedures, as well as to some households. Heretofore it has been known to provide long-distance telephone call timers and long-distance telephone call cost indicators to satisfy this need. However, such timers and cost indicators have depended upon manual operation of the caller, such as the one disclosed in U. S. Pat. No. 3,555,193, which is subject to creating inaccuracies in the call time and call cost as the caller may inadvertently delay or forget to operate such equipment. While it is customary for the telephone company to give time and charges for a call placed through an operator, such is not obtained when using the direct dialing procedure, which is being more widely used to reduce telephone costs. Thus, the importance of accurately indicating call costs and recording total call costs becomes more important.

The electronic long-distance telephone call cost computer and recorder of the present invention operates automatically in response to signals available and received from use of standard telephone equipment. Specifically, the apparatus of the invention is solid state in nature and responds to lifting of the receiver, answering by the called party, and replacing of the receiver to automatically cumulatively indicate the cost of the call being made, cumulatively indicate the cost of all calls made within a certain period of time, and cumulatively indicate the elapsed time of the call. The only adjustment of the apparatus to be made by the caller is to set the charge information based on long-distance rates and as presently computed on the 3-minute and per-minute in excess of three minutes basis. Once this cost data information is set, the apparatus of the invention automatically thereafter functions to indicate the call cost, the elapsed time of the call and the cumulative cost of all calls made.

Accordingly, it is an object of the present invention to provide a new and improved apparatus for computing and recording the cost of long-distance telephone calls, and further an apparatus that automatically operates in response to signals received from the telephone equipment.

Another object of this invention is in the provision of an apparatus for automatically and substantially instantaneously computing and recording the elapsed time and cost of a long-distance telephone call in response to available signals received from the telephone equipment wherein the time and cost information is accurate and precise.

A further object of this invention resides in the provision of an apparatus for cumulatively computing and recording digitally the elapsed time of a long-distance telephone call, the cost of a single call, and the total cost of a plurality of calls made from the equipment.

Other objects, features and advantages of the invention will be apparent from the following detailed disclosure, taken in conjunction with the accompanying sheets of drawings, wherein like reference numerals refer to like parts, in which.

Figures 1, 2:
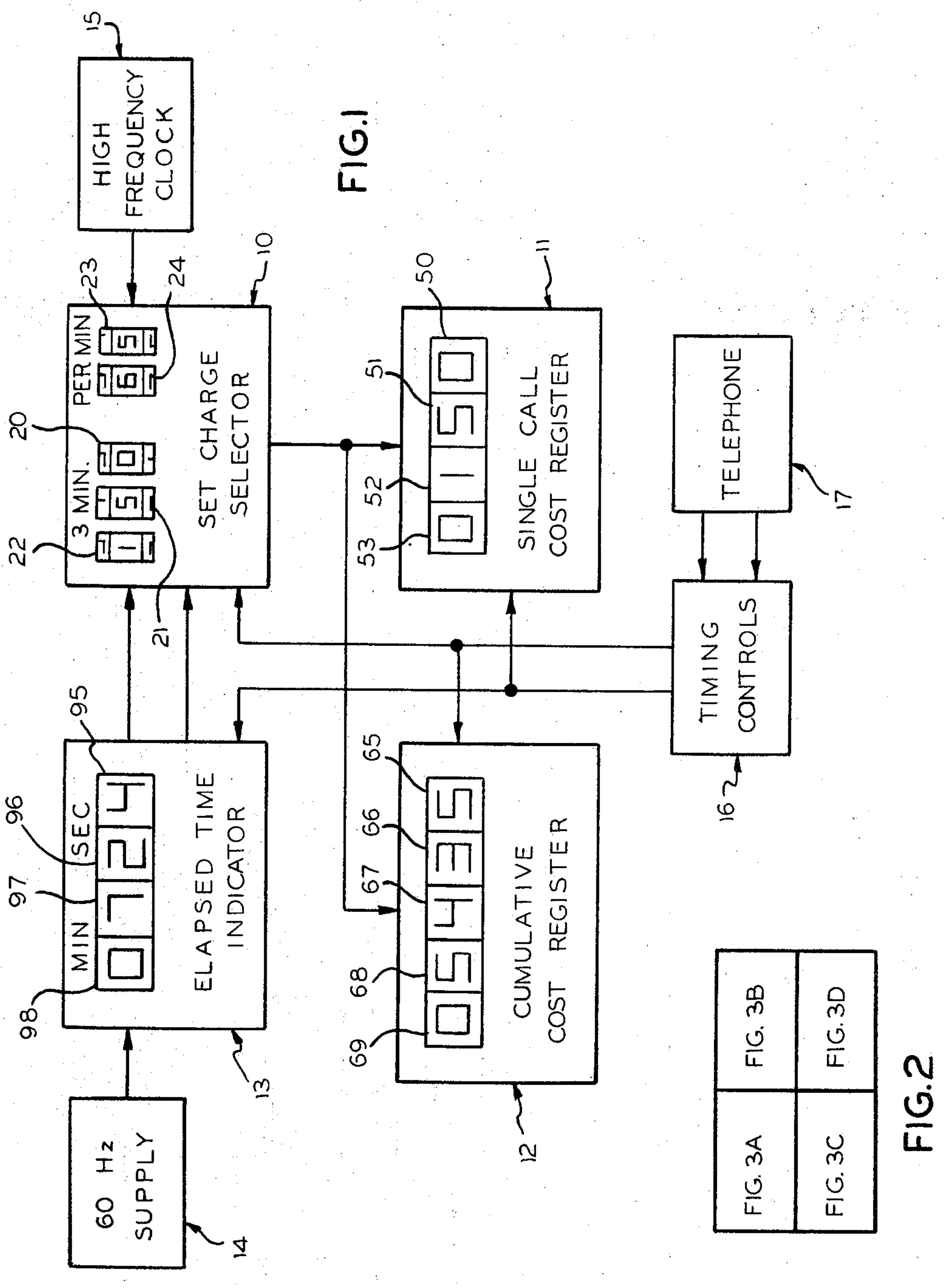
FIG. 1 is a block diagram of the computing and recording apparatus according to the invention.
FIG. 2 is a diagram illustrating the relative positions of FIGS. 3A -3D.

The apparatus as illustrated in FIG. 1 generally includes a set charge selector 10 manually operable to program the call cost data into the apparatus, a single call cost register 11 for cumulatively registering digitally the cost of a single call being made, a cumulative cost register 12 for cumulatively registering digitially the cost of all calls made, and an elapsed time indicator 13 for cumulatively registering the time of a single call being made. A 60 hertz supply 14 drives the elapsed time indicator 13. In order to substantially instantaneously record 3-minute charges and per-minute overtime charges in the cost registers when applicable, a high-frequency or fast clock 15 having an output signal frequency on the order of about 20 kilohertz gates the charge to the cost registers. Timing controls 16 coordinate interaction between the elapsed time indicator, the set charge register and the cost registers for computing the amounts displayed in the cost registers. Signals from a telephone 17 activate the timing controls 16.

It will be appreciated that the computing and recording apparatus of the present invention will be suitably connected to a telephone so as to respond to signals generated by lifting and replacing the receiver and by reaching the called party. Essentially, lifting and replacing the receiver closes and opens a switch, while a 90-volt pulse is generated on the telephone line when the called party is reached. While the computing and recording apparatus hereinafter described is intended to apply to long-distance telephone calls, it could likewise apply to toll calls with modifications within the scope of the invention. Further, inasmuch as the apparatus would not be used when making local calls from a telephone, suitable switching means can be provided for coupling or decoupling the apparatus from the telephone. For purposes of clarity the apparatus will be hereinafter described as being coupled to a telephone where it is intended to make a long-distance telephone call.

The general operation of the apparatus first requires ascertaining the 3-minute and per-minute overtime charges for the call to be made and such can be ascertained from a suitable chart that would be available from the telephone company. This imformation is programmed into the apparatus by manual adjustment of the set charge selector 10. In the event that there be a time when the cost of such long-distance telephone calls is measured other than on a three-minute and per-minute overtime basis, it can be appreciated that suitable modification of the set charge selector can be made to accommodate such a change in costing. Following the programming of the call cost data into the apparatus and assuming the apparatus is coupled to the telephone, the caller may proceed with the call by lifting the receiver and dialing the number. Upon lifting the receiver it appears that nothing happens in the apparatus; yet, internal functioning takes place in the set charge selector 10 as will be hereinafter described.

When the party called is reached, the 90-volt pulse derived from the telephone line upon the lifting of the receiver of the called party substantially simultaneously clears the elapsed time indicator 13 and starts the indicator counting time. Further, substantially instantaneously the single call cost register 11 is cleared and loaded with the 3-minute charge indicated on the set charge selector 10. Also substantially simultaneously the 3-minute charge is registered in the cumulative cost register 12 as an addition to the previous total. Should the call exceed three minutes, the elapsed time indicator 13 causes the per-minute overtime charge to be added to both cost registers, and this is repeated at further 1-minute intervals during the call. At the conclusion of the call, all counting stops and the displays in the cost registers and elapsed time indicator are retained. This information may then be recorded for accounting purposes if so desired prior to the making of the next long-distance call.

The elasped time indicator 13 cumulatively displays the minutes and seconds taken for a call as the call is being made to digitally represent to the caller the calling time. While only minutes and seconds are displayed, it should be appreciated that a section also displaying hours could be added if so desired. The cumulative cost of a single call is displayed in the single call cost register 11 to continuously remind the caller as to the cost of the call as the call progresses and to indicate the total cost of the call at the completion. This register represents the cost of the call in dollars and cents. The cost of calls made over any period of time, such as a day, a week, a month, or the like, is registered in the cumulative cost register 12 which is manually resettable and may be reset at any desired time. It should be appreciated that it is within the scope of the present invention to provide an apparatus which may not include the cumulative cost register but that such does provide additional information that can be helpful in accounting relative to long-distance calls. Similarly, while it is not necessary to digitally represent the elapsed time, it may be helpful in connection with accounting or other procedures.

The set charge selector 10 (FIG. 3D) is divided into two sections for programming 3-minute and per-minute overtine call cost data into the apparatus of the invention and as illustrated the range of costs for a 3-minute call is between 1 cent and $9.99, while the range for the per-minute overtime rate is from one cent to 99 cents. It should be appreciated that the set charge selector could be designed to provide any range of cost data for input to the apparatus. Manually, settable thumbwheel switches are provided on the set charge selector for adjusting the call cost input information although it should be appreciated that any other type of selecting switches may be used to program in the call cost charging information.

The 3-minute section includes thumbwheel switches 20, 21 and 22, respectively, representing units, tens and hundreds, while the per-minute overtime section includes thumbwheel switches 23 and 24, respectively, representing units and tens. Each thumbwheel is capable of setting from 0 to 9, although the units thumbwheel switches may be settable only at 5 and O since present call costing is rounded off in nickels. Essentially, the thumbwheel switches 20, 21 and 22, respectively, represent nickels, dimes and dollars, while the thumbwheel switches 23 and 24, respectively, represent nickels and dimes in terms of money.

Figure 3A:
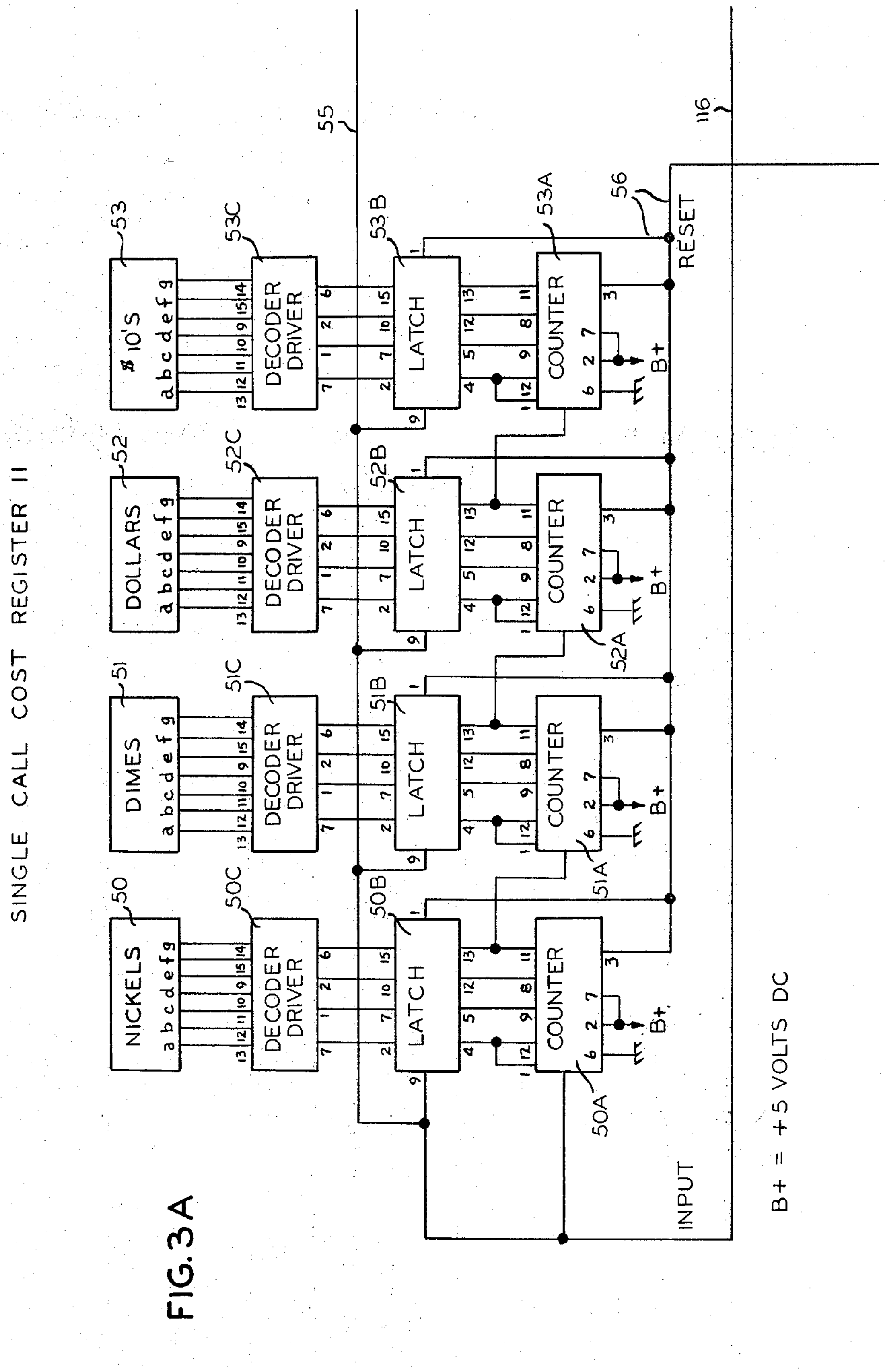
FIGS. 3A -3D are a logic diagram, partly schematic, of the operating circuit for the apparatus illustrated in FIG. 1.
Figure 3B:
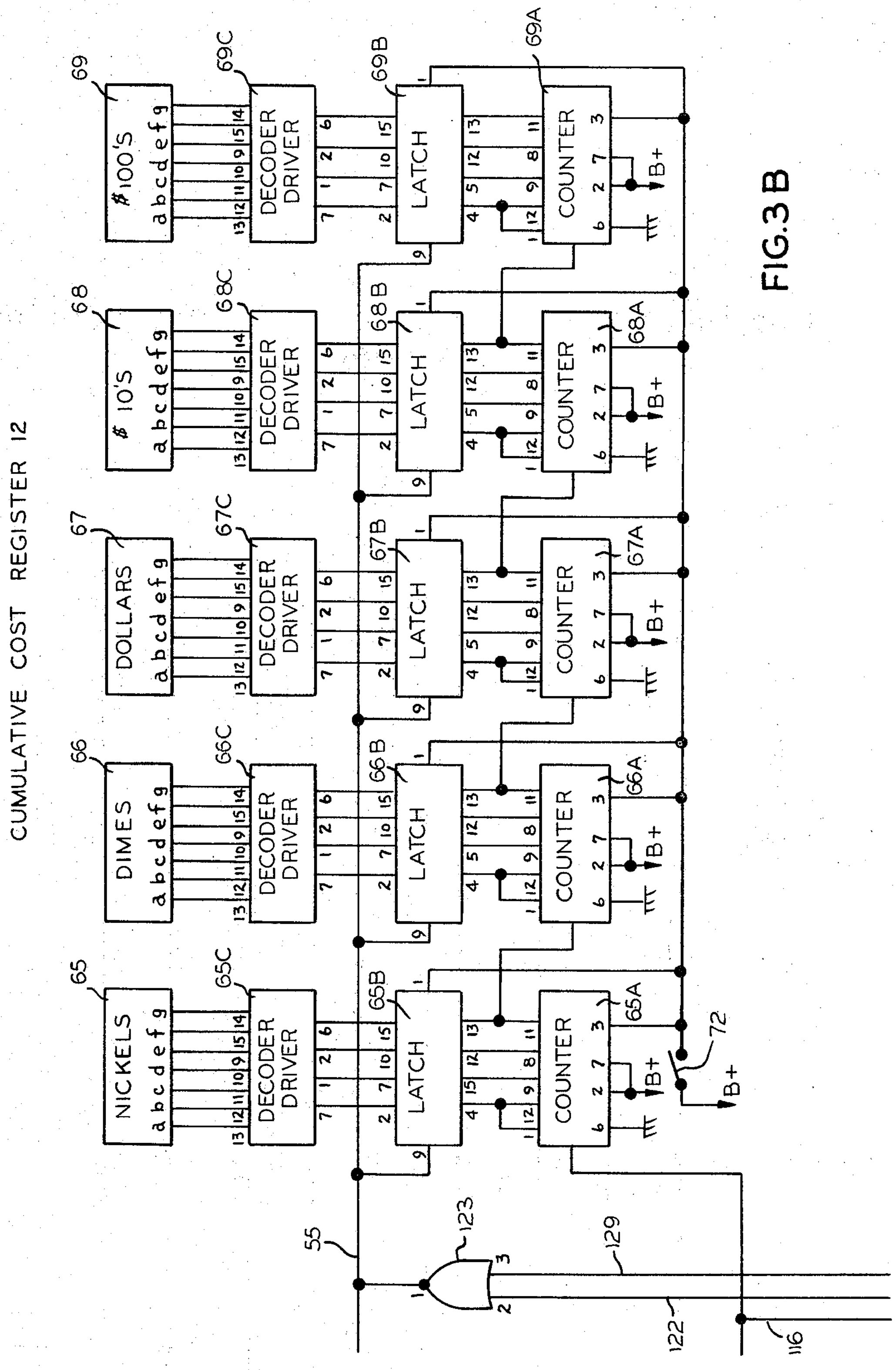
Figure 3C:
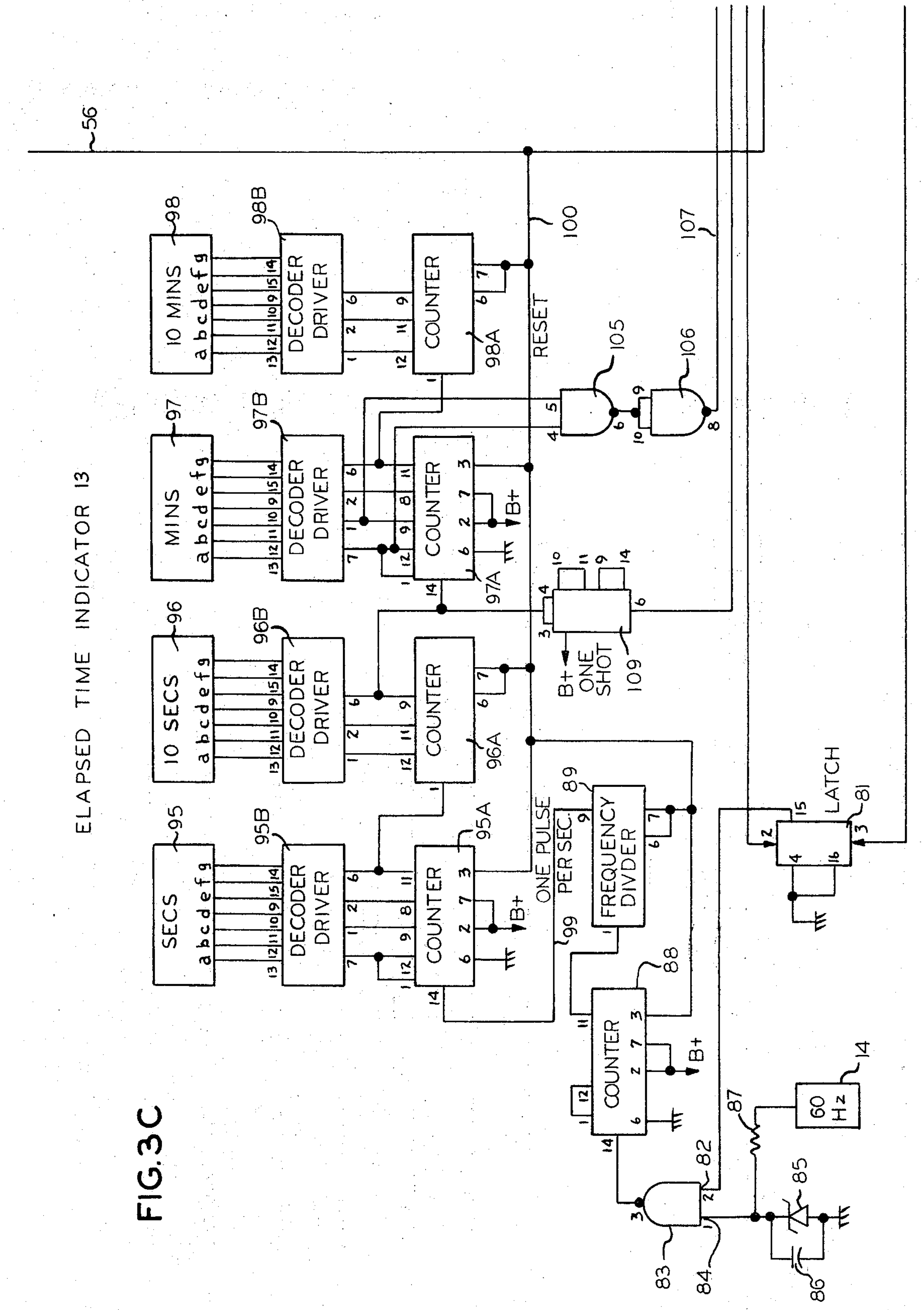
Figure 3D:
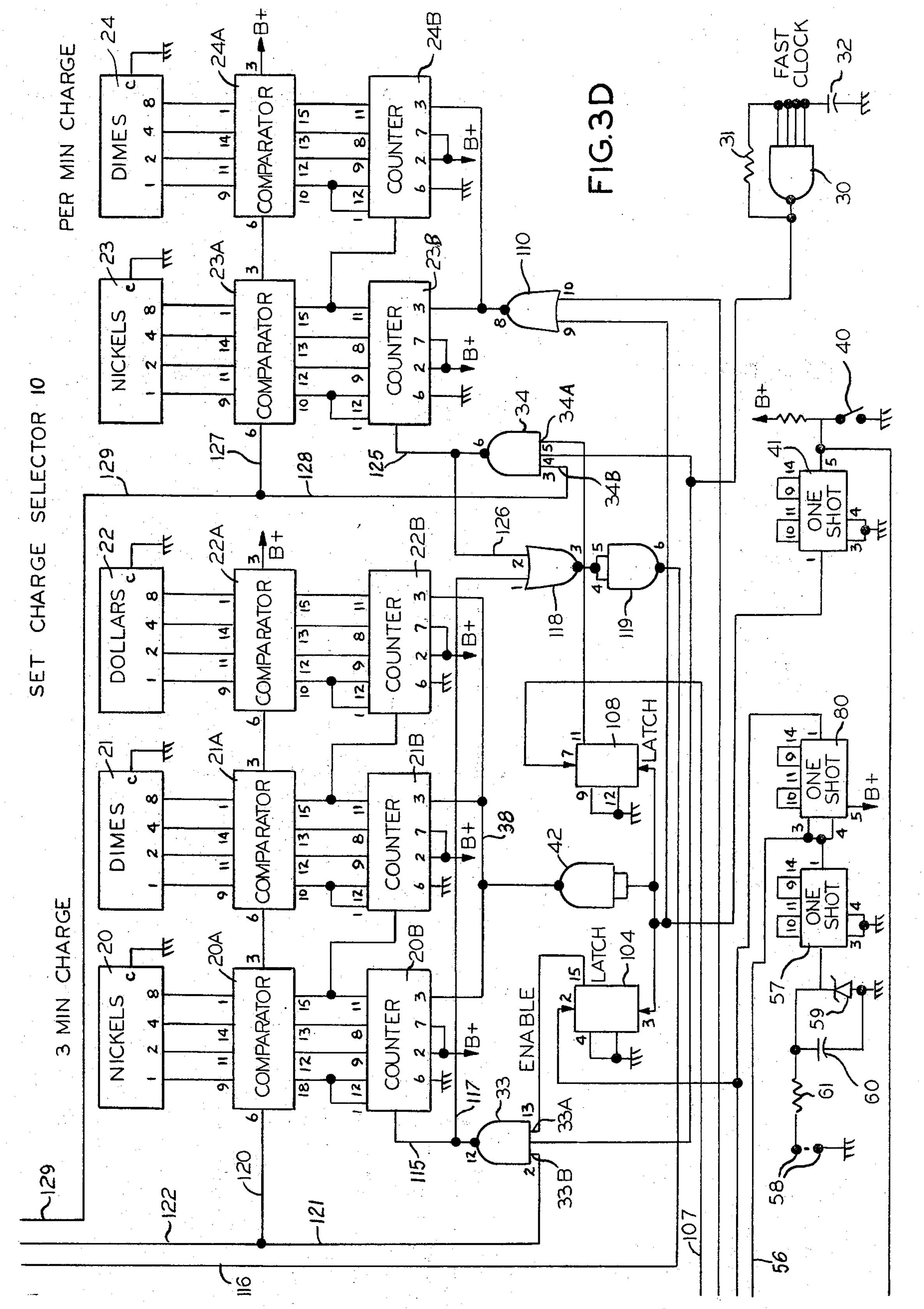

Referring now to the operational circuit in FIG. 3D, the circuitry for the set charge selector 10 allows a predetermined number of pulses to be gated from its input to its output in accordance with the call cost data programmed by the thumbwheel switches 20 to 24 so that computation of charges displayed in the cost registers depends upon the cost data programmed into the set charge selector and the time period of the call as measured by the elapsed time indicator.

The thumbwheel switches 20, 21 and 22 program BCD code information into comparators which control operation of counters into which pulses from a fast clock are delivered. Accordingly, each thumbwheel switch feeds to a comparator which in turn is connected to a counter. The comparators are designated by the numerals 20A to 24A, while the counters are designated by the numerals 20B to 24B. The comparator and counters here, as well as other components hereinafter described, take the form of standard integrated circuit components of the TTL (transistor/transistor logic) type. Specifically, the comparators may be type 7485 circuits, while the counters may be type 7490 circuits.

The fast clock input to the set charge counters 20B to 23B is defined by a fast clock circuit composed of integrated circuit module 30, resistor 31 and capacitor 32. For purposes of providing about a 20 kilohertz clock the integrated circuit module 30 is of the type 7413, while ther resistor 31 has a value of 390 ohms and the capacitor 32 has a value of 0.05 microfarads. The fast clock goes through "and" gates 33 and 34 to the counters of the set charge selector and the cost registers when a logic 1 is applied to their "enable" inputs 33A and 34A. Additionally, with respect to the "and" gate 34, it is opened at 1-minute intervals following a 3-minute period of a call by reset action of the counters 23B and 24B. When the number of pulses delivered to the counters equals the number set by the thumbwheel switches, the comparators give an output to the disable inputs 33B and 34B that gates off the clock input to the counters. The "and" gates 33 and 34 are of the type 7410 circuit. If the thumbwheel switches for the three-minute charge section are set at 150, representing $1.50 as illustrated in FIG. 1, a burst of 150 pulses will appear at the output of this section, and therefore at the cost registers.

The 3-minute charge circuitry is reset to 0 through reset circuitry 38 FIG. 3D prior to a logic 1 being applied to the "enable" input 33A of "and" gate 33. This cycle will be repeated every time a resetting pulse is applied to the counter, assuming that a logic 1 is present at the "enable" input 33A. The reset circuit 38 is activated upon lifting the receiver of the telephone which closes switch 40 to activate a one-shot multi-vibrator 41 which delivers a reset pulse through the integrated circuit module 42 (type 7400 circuit) to the reset circuit 38. The one-shot multi-vibrator 41 may be of a type 74121 circuit. The 3-minute charge circuit of the set charge unit 10 therefore enters the three-minute charge into the cost registers when the called party is reached, while the per-minute overtime charge circuit enters the overtime charges at the end of a three-minute period and 1-minute intervals thereafter.

The circuitry for the signal call cost register 11 and the circuitry for the cumulative call cost register 12 are substantially alike except for the number of digital readouts, there being four digital readouts in the single call cost register and five readouts in the cumulative call cost register. Both cost registers receive the outputs from the set charge selector 10 as programmed in by the elapsed time indicator and the operation of the telephone equipment.

The single call cost register 11(FIG. 3A) includes digital readouts 50 for units, 51 for tens, 52 for one-hundreds, and 53 for one-thousands in the form of seven-segment light displays, representing respectively nickels, dimes, dollars and 10-dollars. While only four digital readouts are provided, it should be appreciated that any number could be built into this register. The seven-segment displays are of the standard commercially available type available from several known sources. The circuitry for each digital readout includes counters 50A to 53A. Each counter 50A-53A counts the number of pulses at its input as received from the set charge selector 10 and feeds this information to the input of triggering circuits or latches 50B to 53B. When a strobe pulse is fed to the triggering circuits 50B to 53B through strobe line 55, the outputs of the triggering circuits change to agree with their inputs. Outputs of the triggering circuits are delivered to decoder/-driver modules 50C to 53C, which convert the BCD outputs of the counters and triggering circuits to decimal information for the seven-segment displays 50 to 53. The triggering circuits are strobed when in a fixed state, thereby preventing a blur of changing numbers on the seven-segment displays. Counters 50A to 53A are reset to 0 or cleared whenever the called party is reached, which produces a 90-volt pulse derived from the phone line and which activates the reset circuit 56 upon energization of the one-shot multi-vibrator 57. The 90-volt pulse which triggers the one-shot multi-vibrator 57 is applied across terminals 58 through a regulated voltage circuit composed of a zener diode 59, a capacitor 60 and a resistor 61 (FIG. 3D). The one-shot multi-vibrator 57 may be of a type 74121 circuit, while the zener diode 59 may have a rating of 4.7 volts, the capacitor 60 have a value of 1,000 picofarads and the resistor 61 have a value of 10 kilo-ohms. The integrated circuit modules utilized are type 7490 for the counters, type 74175 for the latches, and type 7446 for the decoder/drivers.

The cumulative cost register 12 (FIG. 3B), having a similar circuitry to the single call cost register 11, includes digital readout 65 for units, digital readout 66 for tens, digital readout 67 for one-hundreds, digital readout 68 for one-thousands and digital readout 69 for ten-thousands respectively, representing nickels, dimes, dollars, 10-dollars and 100 dollars, all of which are in the form of seven-segment digital displays of the same type used in the single call cost register. Similar to the single call cost register circuitry, the circuitry for the digital readouts includes counter 65A to 69A which feed a predetermined number of pulses to triggering circuits or latches 65B to 69B, the outputs of which agree with the inputs when strobed by a strobe pulse from the strobe line 55. The BCD outputs of the triggering circuits 65B to 69B are received by decoder/-drivers 65C to 69C which convert the outputs to decimal form and drive the seven-segment digital displays and reflect digitally the number of pulses received by the counters. The cumulative total in the cost register 12 holds until the counters and triggering circuits are reset by closing a manual reset switch 72 to apply a signal to the reset line 73 and reset the counters and triggering circuits. The counters, triggering circuits and decoder/drivers, are the same type of integrated circuit modules as utilized in the single call cost register.

The 3-minute charge programmed in the set charge selector 10 is put into both cost registers 11 and 12 when the called party is reached less than 1 microsecond following the triggering of the one-shot multi-vibrator 57 (FIG. 3D). A one-shot multi-vibrator 80 is then triggered, which triggers the triggering circuit or latch 81 (FIG. 3C) to place a logic 1 on the "enable" input 82 of "and" gate 83 and thereby gate "on" the 60 hertz input 14 to the elapsed time indicator 13. The 60 hertz input 14 is connected to the "and" gate input 84 in connection with a regulated voltage circuit composed of a zener diode 85, a capacitor 86 and a resistor 87. The zener diode preferably has a rating of 4.7 volts, while the value of the capacitor 86 is 1,000 picofarads, and the value of resistor 87 is 1 kilo-ohm. The one-shot multi-vibrator 80 may be of a type 74121 circuit, while the latch 81 may be of a type 7476 circuit and the "and" gate 83 be of a type 7400 circuit. The 60 hertz input from the "and" gate 83 is fed through a counter 88 of the type 7490 circuit and through a frequency divider 89 which divides the input by 60 to provide an output of one pulse per second that goes into the elapsed time indicator.

The elapsed time indicator 13 (FIG. 3*c*) includes four digital readouts, designated 95 for units, 96 for tens, 97 for hundreds and 98 for one-thousands, which respectively represent seconds, 10-seconds, minutes and 10-minutes. Accordingly, digital readouts 95 and 96 represent seconds while digital readouts 97 and 98 represent minutes. The digital readouts are of the seven-segment digital display type as employed in the cost registers and reflect the elapsed time as delivered in through the input line 99. The circuitry for each digital readout includes counters 95A to 98A and decoder/drivers 95B to 98B. The decoder/drivers are of a type 7446 circuit, while the counters 95A and 97A are of a type 7490 circuit and the counters 96A and 98A are of a type 7492 circuit. The counters are reset through reset circuit 100 (FIG. 3C) which clears the digital displays and resets them to 0 upon triggering of the one-shot multi-vibrator 57. Similarly, the counter 88 is reset at the same time. No latches are used in the circuitry of the elapsed time indicator since it is desirable to see the seconds count changing.

Simultaneously with the starting of the elapsed time indicator 13, the three-minute charge counter in selector 10 (FIG. 3D) is gated on by triggering the triggering circuit or latch 104 allowing a burst of the fast clock pulses to run up the three-minute charge into both cost registers by placing a logic 1 on "enable" input 33A of "and" gate 33. The "and" gate 33 is gated off when the count in the comparators from the input of the thumb-wheel switches equals the count in the counters wherein an output is produced by the comparators on line 120 which is delivered simultaneously through line 121 to the disable input 33B of the "and" gate 33 to render it off and to line 122 to the "or" gate 123 (FIG. 3B) for placing a strobe pulse on strobe line 55 FIGS. 3A and 3B to condition the latches of the cost register 11 and 12 so that the outputs to the decoder/drivers are the same as the inputs from the counters, thereby registering the new count on the digital displays. It will be recognized that the count from the three-minute charge section of the set charge unit 10 will be placed into the counters only once during each single telephone call.

Following the measurement of three minutes by the elapsed time indicator 13 (FIG. 3C), the three-minute measurement is detected from the counter 97A to trigger the latch 108 (FIG. 3D) through "and" gate 105 (FIG. 3C) and module 106 (type 7400 circuits) and line 107 so that an "enable" signal is applied to the "enable" input 34A of "and" gate 34 (FIG. 3D), and allow a burst of pulses to enter the counters of the per-minute overtime charge section through the input line 125 and at the same time send the fast pulses through line 126, "or" gate 118 and module 119 (type 7400 circuits), and the input line 116 to the cost register counters. Both latches 104 and 108 may be part of a type 7476 circuit. The fast clock input to the "and" gate 34 is gated off when the outputs of the comparators in the per-minute overtime charge section (FIG. 3D) equal the inputs as selected by the thumbwheel switches to proudce an output signal through line 127 that functions to simultaneously disable the "and" gate 34 through line 128 and apply a strobe pulse to the cost register latches through line 129 and the "or" gate 123 (FIG. 3B). Thereafter, at 1-minute intervals measured by the elapsed time indicator 13, the one-shot multivibrator 109 (FIG. 3C) (type 74121 circuit) is triggered by the counter 96A in the elapsed time indicator to, through "or" gate 110 (FIG. 3D) (type 7400 circuit), reset the counters 23B and 24B of the per-minute overtime charge section to zero which causes the output signal of the comparators to be removed from the output line 127 and permit the "and" gate 34 to be gated on so that the counters in the per-minute overtime charge section, as well as the cost register counters, may be provided with a succeeding burst of pulses equal to the count at the inputs of the comparators 23A and 24A. The recycling of the per-minute overtime charge section is continued for every 1 minute interval thereafter measured by the elapsed time indicator 13 to cumulatively display the total call cost in the single call cost register 11, as well as cumulatively adding the call cost to the cumulative cost register 12.

The 3-minute charge and the per-minute overtime charges are loaded into the counters of the cost registers 11 and 12 simultaneously with the loading of the counters in the set charge selector 10. Specifically, when the "and" gate 33 receives an enabling signal at the "enable" input 33A, the fast clock discharges into the counters 20B, 21B and 22B through the input line 115. At the same time the count is delivered to the counter input circuit 116 of the cost registers by virtue of line 117, "or" gate 118 and module 119. In the event that the cost registers are part way through a count when the receiver of the phone is replaced, the run-up of charges will still be completed.

In the elapsed time indicator 13 (FIG. 3*c*) it can be appreciated that the counter 95A recycles for every ten input pulses representing 10 seconds and then applies a single pulse to its output line for the next higher stage counter 96A which represents ten seconds in 96A and to be displayed on the seven-segment digital display 96. Recycling of the counter 96A takes place for each six input pulses received from the counter 95A representing 60 seconds and then it delivers a single output pulse to the counter 97A to represent 1-minute on the digital display 97. Similarly, the counter 97A recycles for each 10 input pulses received representing ten minutes to apply an output signal to the counter of the next highest order, which is counter 98A to represent 10 minutes on its digital display.

The counters in the cost registers recycle for each ten pulses and provide an output pulse to the counter of the next highest order, an therefore the input counts are received in the counters of the lowest order to be thereafter registered cumulatively in the other counters as the count increases.

It should be understood that all specific components and parameters included in this specification are provided solely for purposes of illustrating an operative embodiment and not as a limitation on the invention.

It will be understood that modifications and variations may be effected without departing from the scope of the novel concepts of the present invention, but it is understood that this application is to be limited only by the scope of the appended claims.

We claim:

1. An electronic solid state long-distance telephone call cost computer apparatus for computing and recording the cost of each long-distance telephone call initiated from a given calling telephone, actuated by the lifting and replacement of the calling telephone to operate switch means coupled to the calling telephone, and further actuated by a call-completion signal generated in the telephone system when a called party answers at a called telephone, the computer apparatus comprising:

call timing means for timing the duration of each completed call;

settable charge selector means for storing initial fixed charge data for a given predetermined initial call interval and incremental charge data for subsequent additional predetermined incremental call intervals;

call cost register means, including a digital display, for providing a substantially instantaneous display of cumulative call cost in dollars and cents;

and computer circuit means, coupled to said switch, to said timing means, to said charge selector means, and to said call cost register means, for automatically recording, in the call cost register means, the cost of each long-distance call made from the calling telephone, said computer circuit means comprising:

reset means for resetting said timing means and said call cost register means immediately upon occurrence of said call-completion signal;

initial cost transfer means initiating operation of said call timing means and for applying the complete initial fixed charge data from said charge selector means to said call cost register means substantially instantaneously upon resetting of said call timing means and said call cost register;

incremental cost transfer means for applying the complete incremental charge data from said charge selector means to said call cost register means substantially instantaneously upon completion of timing out the initial call interval by said call timing means and for again applying the complete incremental charge data from said charge selector means to said call cost register means substantially instantaneously upon completion of timing out of each incremental call interval following said initial call interval;

and termination means for interrupting operation of said computer apparatus, with the cumulative call cost held in and displayed by said call cost register means, upon operation of said switch by replacement of the calling telephone.

2. An electronic long-distance cost computer apparatus according to claim 1, in which said computer circuit means further comprises preliminary reset means for conditioning said charge selector means for operation upon operation of said switch by lifting of the calling telephone.

3. An electronic long-distance cost computer apparatus according to claim 1, in which said call cost register means includes a single call cost register and a cumulative multi-call cost register, and in which only said single call cost register is reset upon occurrence of said call-completion signal.

4. An electronic long distance cost computer apparatus according to claim 3, in which each said register includes latch means to preclude change of the register display during transfer of data into the register.

5. An electronic long-distance cost computer apparatus according to claim 3, in which said call cost register means further comprises manual reset means for resetting said cumulative multi-call cost register.

6. An electronic long distance cost computer apparatus according to claim 5, in which said call timing means includes digital readout means cumulatively displaying the total elapsed time of a call.

7. An electronic long-distance cost computer apparatus according to claim 1, in which said call timing means includes digital readout means cumulatively displaying the total elapsed time of a call.

* * * * *